July 26, 1966  J. PALFREYMAN  3,262,636
GAS TURBINE ENGINE
Filed Aug. 24, 1964
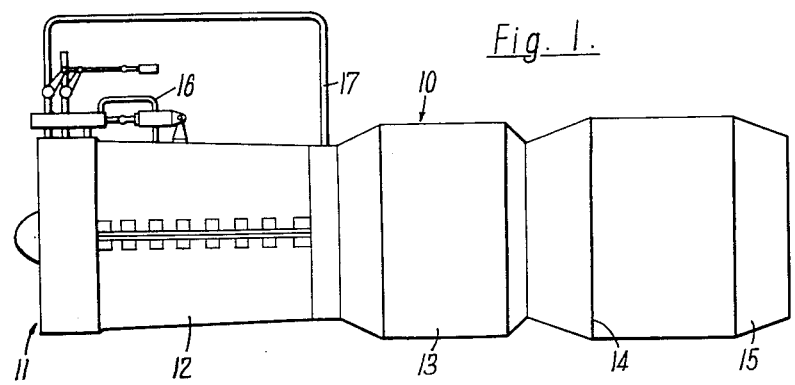
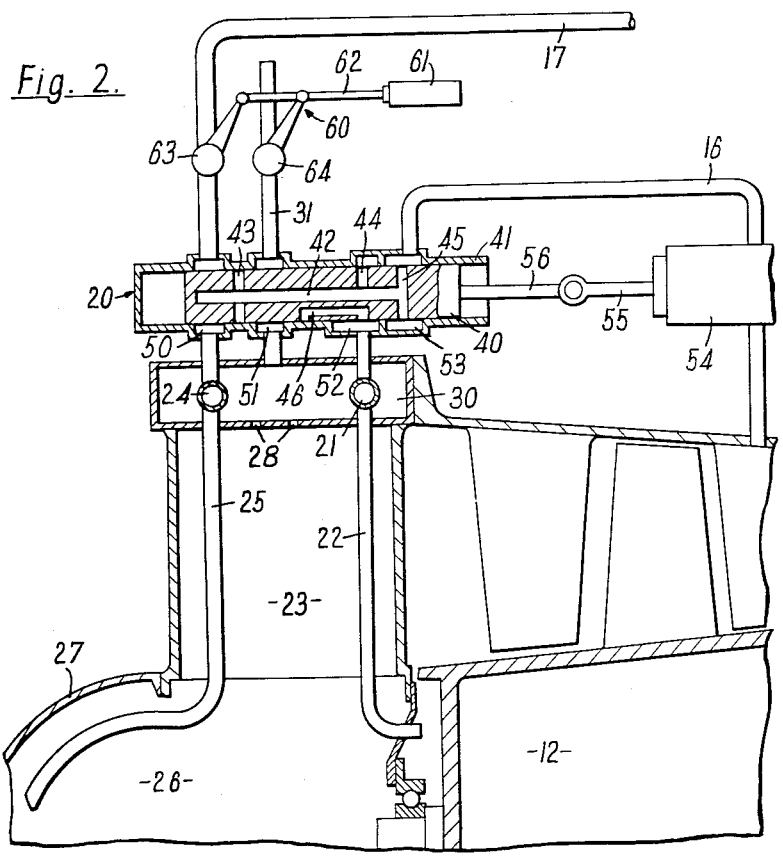
Inventor
JACK PALFREYMAN
By
Cushman, Darby & Cushman
Attorneys

United States Patent Office 3,262,636
Patented July 26, 1966

3,262,636
GAS TURBINE ENGINE
Jack Palfreyman, Tansley, near Matlock, England, assignor to Rolls-Royce Limited, Derby, England, a company of Great Britain
Filed Aug. 24, 1964, Ser. No. 391,634
Claims priority, application Great Britain, Aug. 30, 1963, 34,485/63
8 Claims. (Cl. 230—132)

This invention concerns a gas turbine engine and an aircraft provided therewith.

According to the present invention there is provided a gas turbine engine having a de-icing duct through which relatively warm air may pass to remove ice from components of the engine adjacent the de-icing duct, a cooling duct through which relatively cool air may pass to cool engine components, and valve means for directing the cooling air through part of the de-icing duct whereby the cooling air may be cooled.

Preferably there is also provided in said de-icing duct, a shut-off valve which prevents relatively warm air from passing through said part of the de-icing duct when the cooling air is passing therethrough.

The said part of the de-icing duct may pass across the intake to said gas turbine engine. Thus it may be disposed within an inlet guide vane of the compressor means of the gas turbine engine. Preferably there are a plurality of de-icing ducts which pass through a plurality of inlet guide vanes equi-spaced about said intake, an annular manifold being disposed about and communicating with the radially outer ends of the de-icing ducts within the inlet guide vanes, said valve means permitting flow of relatively warm air or of cooling air into said manifold.

The valves means may be a common valve which communicates with supply ducts supplying relatively warm air and cooling air, with said manifold, and with said cooling air duct.

In a preferred embodiment, the common valve has two operative positions, in the first of which it prevents flow of relatively warm air from its supply duct to said manifold and also permits cooling air to flow from its supply duct to said cooling air duct, and in the second of which it permits the cooling air to flow from its supply duct, through said manifold and de-icing ducts and to the cooling air duct.

Preferably the shut-off valve operates simultaneously with said common valve to prevent any relatively warm air being supplied to the common valve when it is in its second operative position.

In a preferred embodiment, the engine is adapted for use at supersonic speeds, means being provided for placing the common valve in said first and second operative conditions when engine is operating under subsonic and supersonic conditions respectively.

The invention also includes an aircraft provided with a gas turbine engine as set forth above.

The invention is illustrated, merely by way of example, in the accompanying drawings in which:

FIGURE 1 is a diagrammatic view of a gas turbine engine according to the present invention, and FIGURE 2 is a cross-sectional view of part of the engine shown in FIGURE 1.

Referring to the drawings, there is shown a supersonic gas turbine engine 10 comprising an air intake 11, compressor 12, combustion equipment 13, turbine 14, and a jet pipe 15 through which combustion gases exhaust to atmosphere.

Relatively cool air is bled from the compressor 12 adjacent its upstream end, e.g. at the first or second stage, and is directed through a supply duct 16 to be used as cooling air. Relatively warm air is bled from the compressor 12 adjacent its downstream end, e.g. at the last stage, and is directed through a supply duct 17 to be used as de-icing air.

As shown more clearly in FIGURE 2, the relatively cool air from supply duct 16 may flow (in a manner described in detail below) through a spool valve 20 to an annular manifold 21, and then, to a plurality of cooling ducts 22. Cooling ducts 22 direct the air through inlet guide vanes 23 to parts of the engine 10 requiring cooling air e.g. the combustion equipment 13 and turbine 14. The relatively warm air from supply duct 17 may flow (in a manner described in detail below) through spool valve 20 to an annular manifold 24. This de-icing air may then flow through a plurality of de-icing ducts 25 disposed at the upstream edge of inlet guide vanes 23 to a chamber 26 within a fairing 27. This air then passes radially outwardly through the inlet guide vanes 23, through apertures 28 into an annular chamber 30 disposed about the inlet guide vanes 23. The de-icing air may then pass through spool valve 20 to an exhaust duct 31, then passing to further engine components which require de-icing, or passing to atmosphere as waste from the engine.

The spool valve 20 comprises a central spool 40 disposed with a casing 41. The spool 40 has a longitudinal drilling 42 and transverse drillings 43, 44, 45, communicating therewith. A generally U-shaped drilling 46 is also provided in the spool 40. The casing 41 is provided with four annular ports 50, 51, 52, 53 which respectively communicate with supply duct 17 and manifold 24, annular chamber 30 and exhaust duct 31, manifold 20, and supply duct 16.

The spool 40 is movable within the casing 41, movement being effected by a ram 54, which is connected by a rod 55 to a link 56 rigidly attached to one end of spool 40.

In the operative position shown in FIGURE 2, relatively cool air through supply duct 16 to annular port 53, through transverse drilling 45, longitudinal drilling 42 and transverse drilling 44 to annular port 52. From annular port 52 the air passes to manifold 20, where it is distributed to cooling ducts 22. This cooling air is then directed to combustion equipment 13 and turbine 14, by means not shown.

Relatively warm air from supply duct 17 passes through annular port 50 to manifold 24 and thus through the plurality of de-icing ducts 25 to chamber 26. In passing through inlet guide vanes 23 the air warms the leading edge and prevents the formation of ice. From chamber 26 the air passes through inlet guide vanes 23 through ports 28 into chamber 30. The air then passes through annular port 51 into exhaust duct 31 and thus to atmosphere.

Thus in the position shown, the spool valve 20 permits flow of both cooling and de-icing air in the manner set forth above. This operative position is used in subsonic conditions, when the formation of ice must be prevented and when adequate cooling can be obtained by the means shown.

However, at supersonic conditions, there is no danger of ice formation, and therefore de-icing air is not required. Also, at supersonic conditions, the temperature of the air in the upstream stages of the compressor is quite high, and it has been found desirable to cool the air bled off for cooling purposes.

Under supersonic conditions the spool valve 20 may be moved to a second operative position (not shown in the drawings). In this second position, the spool 40 is moved to the left whereby annular port 50 communicates with transverse drilling 43, annular port 51 communicates with longitudinal drilling 46, annular port 52 communicates with longitudinal drilling 46, and annular port 53 communicates with transverse drilling 45. Transverse drilling 44 will no longer communicate with annular port 52 in this second operative position.

A shut-off valve 60 comprising a ram 61 having a rod 62 attached to the control levers of two shut-off cocks 63, 64, is also operated with spool valve 20 to shut-off flow of de-icing air in supply duct 17 and exhaust duct 31. Thus in this second operative position of spool valve 20 no de-icing air will flow at all. However, cooling air from supply duct 16 will flow through annular port 53, transverse drillings 45, longitudinal drilling 42 and transverse drilling 43 to annular port 50. The cooling air will then flow through manifold 24 and de-icing ducts 25. In flowing through the upstream edge of the inlet guide vanes 23, the cooling air will be cooled further, since the air flowing past the inlet guide vanes is cooler than the air which is bled off the compressor through supply duct 16. The cooled cooling air then flows through chamber 26 radially outwardly through inlet guide vanes 23 and into annular chamber 30 through drillings 28. The cooled cooling air then flows through annular port 51, longitudinal drilling 46 and annular port 52 into manifold 21. From here, the cooled cooling air flows through the normal cooling air duct 22 to the combustion equipment 13 and turbine 14.

When subsonic conditions are again prevailing, ram 54 and ram 61 are operated to return the spool 40 to its right hand or first operative position, shown in FIGURE 2, and to return the shut-off cocks 63, 64 to their positions in which de-icing air can flow once more.

It will be appreciated that ram 61 and ram 54 need not be operated simultaneously, although preferably they are so operated. Operation of the rams can be controlled manually by the pilot, or automatically in accordance with variation in ambient conditions, engine speed or the like.

The air exhausting through exhaust duct 31 need not be exhausted to atmosphere, but could be used to de-ice other components of the engine 10 or of the aircraft (not shown) in which it is fixed in operation.

I claim:

1. A gas turbine engine having a de-icing duct, engine components disposed adjacent the de-icing duct, means for passing relatively warm air through said de-icing duct to remove ice from said components, a cooling duct, further engine components adapted to be cooled by air from said cooling duct, means for passing relatively cool air through said cooling duct, and valve means for directing the cooling air through part of the de-icing duct, whereby the cooling air may be cooled.

2. A gas turbine engine having a de-icing duct, engine components disposed adjacent the de-icing duct, means for passing relatively warm air through said de-icing duct to remove ice from said components, a cooling duct, further engine components adapted to be cooled by air from said cooling duct, means for passing relatively cool air through said cooling duct, valve means for directing the cooling air through part of the de-icing duct whereby the cooling air may be cooled, and a shut-off valve provided in said de-icing duct for preventing relatively warm air from passing through said part of the de-icing duct when the cooling air is passing therethrough.

3. A gas turbine engine having an intake, a de-icing duct, engine components disposed adjacent the de-icing duct, means for passing relatively warm air through said de-icing duct to remove ice from said components, a cooling duct, further engine components adapted to be cooled by air from said cooling duct, means for passing relatively cool air through said cooling duct, valve means for directing the cooling air through part of the de-icing duct which passes across the intake to said gas turbine engine whereby the cooling air may be cooled, and a shut-off valve provided in said de-icing duct for preventing relatively warm air from passing through said part of the de-icing duct when the cooling air is passing therethrough.

4. A gas turbine engine having an intake, compressor means, an inlet guide vane of the compressor means, a de-icing duct, engine components disposed adjacent the de-icing duct, means for passing relatively warm air through said de-icing duct to remove ice from said components, a cooling duct, further engine components adapted to be cooled by air from said cooling duct, means for passing relatively through said cooling duct, valve means for directing the cooling air through part of the de-icing duct, which passes across the intake to said engine within said inlet guide vane, whereby the cooling air may be cooled, and a shut-off valve provided in said de-icing duct for preventing relatively warm air from passing through said part of the de-icing duct when the cooling air is passing therethrough.

5. A gas turbine engine having an intake, compressor means, a plurality of inlet guide vanes equi-spaced about said intake, a plurality of de-icing ducts which pass through said inlet guide vanes, an annular manifold disposed about and communicating with the radially outer ends of the de-icing ducts within the inlet guide vanes, engine components disposed about the de-icing ducts, means for passing relatively warm air to said manifold and thus through said de-icing ducts to remove ice from said components, a plurality of cooling air ducts, further engine components adapted to be cooled by air from said cooling ducts, means for passing relatively cool air through said cooling ducts, and valve means for directing cooling air to said manifold and thus through said de-icing ducts whereby the cooling air may be cooled.

6. A gas turbine engine having an intake, compressor means, supply ducts supplying relatively warm and relatively cool air, a plurality of inlet guide vanes equi-spaced about said intake, a plurality of de-icing ducts which pass through said inlet guide vanes, an annular manifold disposed about and communicating with the radially outer ends of the de-icing ducts within the inlet guide vanes, engine components disposed about the de-icing ducts, means for passing relatively warm air to said manifold and thus through said de-icing ducts to remove ice from said components, a plurality of cooling air ducts, further engine components adapted to be cooled by air from said cooling ducts, means for passing relatively cool air through said cooling ducts, and a common valve having two operative positions, in the first of which it permits flow of relatively warm air from its supply duct to said manifold and also permits cooling air to flow from its supply duct to said cooling air ducts, and in the second of which it permits the cooling air to flow from its supply duct, through said manifold and de-icing ducts and to the cooling air ducts.

7. A gas turbine engine as claimed in claim 6 including a shut-off valve which operates simultaneously with said common valve to prevent any relatively warm air being supplied to the common valve when it is in its second operative position.

8. A gas turbine engine adapted for use at supersonic speeds and having a plurality of inlet guide vanes equi-spaced about said intake, a plurality of de-icing ducts which pass through said inlet guide vanes, an annular manifold disposed about and communicating with the radially outer ends of the de-icing ducts within the inlet guide vanes, engine components disposed about the de-icing ducts, means for passing relatively warm air to said de-icing ducts to remove ice from said components, a plurality of cooling air ducts, further engine components adapted to be cooled by air from said cooling ducts, means for passing relatively cool air through said cooling ducts, a common valve having two operative positions, in the first of which it permits flow of relatively warm air from its supply duct to said manifold and also permits cooling air to flow from its supply duct to said cooling air ducts, and in the second of which it permits the cooling air to flow from its supply duct, through said manifold and de-icing ducts and to the cooling air ducts, and means for placing the common valve in said first and second operative conditions when the engine is operating under subsonic and supersonic conditions respectively.

References Cited by the Examiner

UNITED STATES PATENTS

| | | | |
|---|---|---|---|
| 2,747,365 | 5/1956 | Rainbow | 60—39.09 |
| 2,812,897 | 11/1957 | Cameron | 60—39.09 |
| 2,827,760 | 3/1958 | Marechant et al. | 230—132 |
| 2,927,725 | 3/1960 | Rainbow | 230—132 |
| 2,940,258 | 6/1960 | Lombard et al. | 253—39.1 |

FOREIGN PATENTS 201,508   4/1956   Australia.

MARK NEWMAN, *Primary Examiner.*

SAMUEL LEVINE, *Examiner.*

HENRY F. RADUAZO, *Assistant Examiner.*